United States Patent Office 2,726,995
Patented Dec. 13, 1955

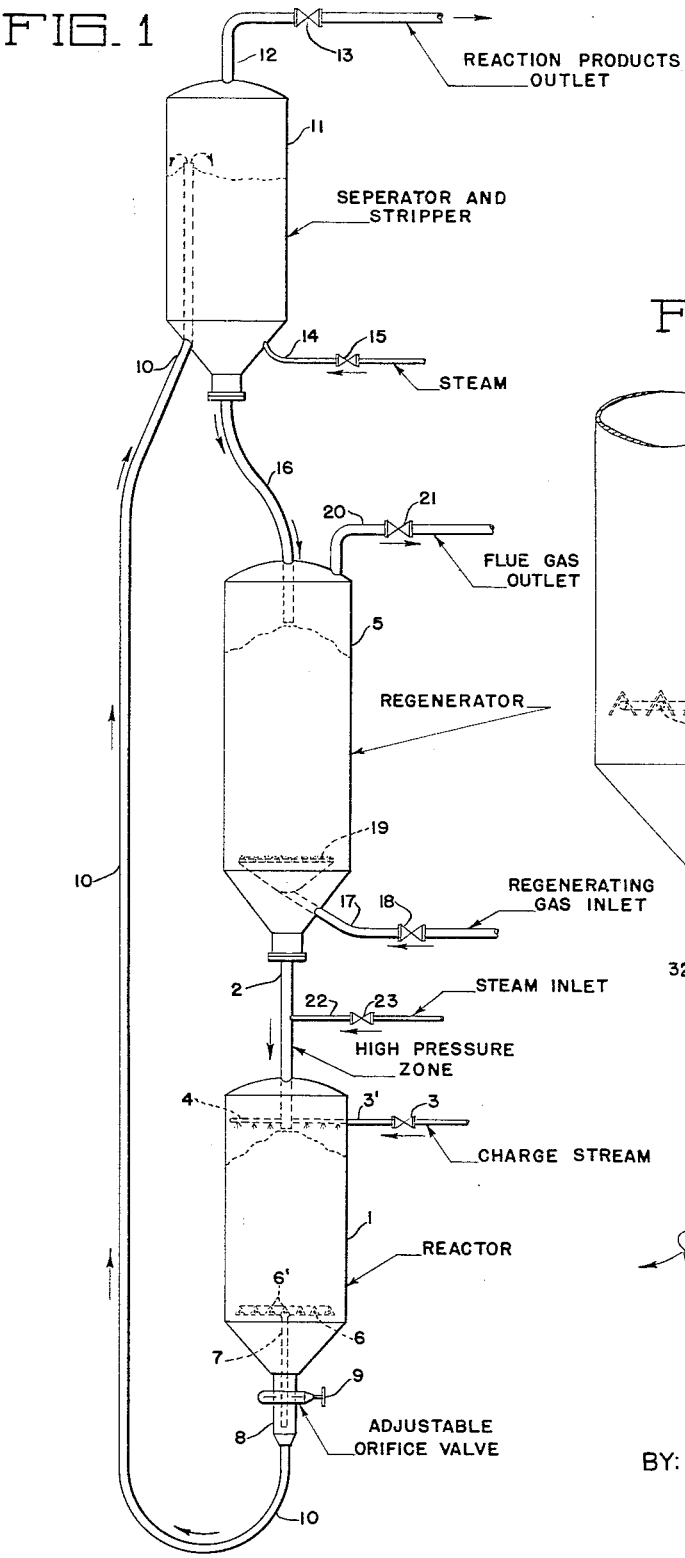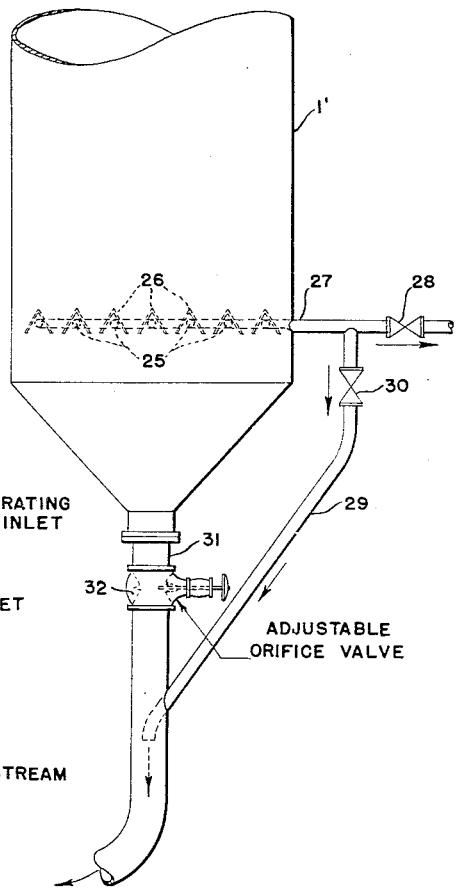

2,726,995

METHOD FOR CONTACTING AND TRANSPORTING SUBDIVIDED CONTACTING MATERIAL

Louis S. Kassel, Oak Park, Ill., assignor to Universal Oil Products Company, Chicago, Ill., a corporation of Delaware Application September 13, 1950, Serial No. 184,673

9 Claims. (Cl. 196—52)

This invention relates to an improved method for effecting the contacting and transporting of subdivided solid contact material, and more particularly to a moving bed catalytic conversion system, wherein a hydrocarbon reactant stream contacts the catalyst particles in a cocurrently descending catalyst bed and resulting product vapors are separated from and subsequently recombined with the contacted catalyst particles in an improved and advantageous manner.

The present improved process is used advantageously in a continuous conversion operation, wherein solid particles contacted in a conversion zone are passed to a separate reactivation and heating zone, so that they may be continuously recirculated to the conversion zone. The improved operation is also adapted for use in connection with a unitary system providing for gravity flow of the catalyst or other solid contacting material in descending relatively compact beds of material through each of the principal contacting or conversion zones, with preferably a counter-current flow between the particles and an oxidizing gaseous stream in the reactivation zone, and conversely, provision for cocurrent flow of the reactant stream and solid particles in the reaction zone.

A special feature of the improved process of this invention effects a method for utilizing the vaporous product stream from the reaction zone to bring about a smooth fluidized flow, or gas lift, for transporting solid particles to the upper end of the conversion unit for subsequent downward flow through the various contacting zones. The improved fluidized flow is effected by separating the vaporous product stream from the contact material within the lower portion of the reaction zone, and subsequently effecting a recombining of vapors and/or gases with a regulated particle flow, such that the gaseous stream is recombined and introduced into mixture with the particles while moving in the same direction of flow. Where the gaseous stream and the particles recombine in cocurrently moving streams, there is not the characteristic turbulence and eddy currents, which normally occur when catalyst falls into a rising gas stream.

The catalyst or contact material employed in the present process is preferably in the form of small substantially spherical particles. The size of the solid particles, whether spherical or of other regular or irregular shape, is sufficient that they will not be excessively compacted to give a high pressure drop for the fluid streams which are passed in contact therewith. However, their size, in relation to their average density, is not sufficiently great to hinder their ready transportation by gas lift. For example, the spherical particles of a cracking catalyst consisting predominantly of silica and one or more metal oxides, such as alumina, zirconia, magnesia, or the like, may have a suitable particle size of the order of from 2 to 5 mm. average diameter. In order to avoid attrition and the presence of substantially fine particles of a powdery or dusty nature within the beds, the particles charged to the system are preferably of substantially uniform or well graded size.

Broadly, the present invention provides an improved method for converting an organic reactant stream in the presence of subdivided solid contact material, in a manner which comprises, introducing the reactant stream into the upper portion of a confined reaction zone and passing it downwardly cocurrently with a descending bed of heated contacting particles, effecting the separation of a resulting vaporous product stream from the particles within the lower portion of the reaction zone and permitting the particles to be discharged downwardly in a free flow through restricting means at the bottom of the zone, subsequently recombining at least a portion of the separated product stream with a regulated descending stream of particles discharged from the lower portion of the reaction zone, and passing the resulting commingled stream upwardly in a fluidized lift of the particles to an elevated and confined separating zone, discharging the reaction product stream from the upper portion of the separating zone and passing the contacted particles downwardly in a gravity flow to the upper portion of a confined reactivation zone, introducing a gaseous reactivating stream to the lower portion of the regeneration zone and countercurrently contacting the particles as they descend in a substantially compact bed, removing resulting reactivation gases from the upper portion of the reactivation zone, and continuously passing resulting reactivated particles from the lower end of the regeneration zone to the upper portion of the confined reaction zone for reuse therein.

In a preferred arrangement of the contacting zones, each of the separate confined contacting zones are maintained in a substantially vertical alignment, with the reaction zone being the lowermost of the series of contacting zones. Thus, the contacted catalyst or other contact material, is elevated to a separation zone by the reaction product stream and separated particles subsequently pass downwardly through the regeneration zone, the reaction zone and other auxiliary zones which may be used, as a continuously descending relatively compact bed of material, with gravity flow from one zone to another.

In accordance with the specific feature of the present invention, vapor collecting pipes or gas withdrawal ducts are provided within the lower portion of the reactor zone such that all of the resulting product vapors and/or gases may be separated from the cocurrent flow with the descending particle bed. Thus, substantially only the particles themselves pass in a descending gravity flow below the zone of the vapor and gas separation. Vapor collecting pipes in turn connect with a manifold or header which provides means for subsequently recombining at least a portion of the gas or vaporous stream with the contacted particles and effecting a fluidized lift of solids to an elevated zone.

In one embodiment, the contacted particles may descend vertically from the bottom of the reaction zone through either a fixed or adjustable orifice, at a flow rate independent of the gas or vapor flow or of the pressure, since the gaseous stream is substantially all independently removed through the gas collecting system and manifold. The gas carrying manifold may be positioned to pass from the collecting zone concentrically through the particle outlet conduit and orifice or restriction to a point therebeyond, such that the catalyst and gaseous stream may recombine in streams moving in the same direction, and the combined or commingled stream may describe a fluidized lift of the particles to an elevated separating and hopper zone, without the characteristic eddy region where catalyst falls into a rising gas stream. Alternatively, the gas and vapor header connecting with the gas collecting system, may discharge from the side of the reaction zone, so that a portion of the product stream of gas or vapor not needed for the gaseous lift may be withdrawn and passed to recovery zone, while a connecting conduit provides means for withdrawing and passing a gas-lift portion of the vapor stream to the particle discharging conduit and introducing the gas stream at a point beyond a fixed orifice or adjustable restriction. The latter, in turn, controls the flow of contacted particles from the lower portion of the reaction zone. Here again, the gas or vapor product line joins with the particle conduit line so that the gaseous stream enters and commingles with the particle stream such that they recombine moving in the same direction.

In a preferable arrangement of zones, such as hereinabove mentioned, having vertical alignment of contacting zones and the reaction zone as the lowermost zone, steam or other substantially inert gaseous medium is introduced into the system at a point between a reactivation zone and the reaction zone such that a relatively high pressure zone is provided at the upper end of the reaction zone and maintains the downward movement of the hydrocarbon charge stream cocurrently with the descending particle bed through the reaction zone. A low pressure zone is maintained in the elevated separating zone to which the particles are carried by the resulting product stream in a fluidized lift, thus the fluidized lift of the particles from the lower end of the reaction zone is aided in their upward travel to the elevated separating and hopper zone. A confined separating zone may also serve as a stripping zone, with steam or other inert gaseous stripping medium being charged to the lower end thereof, such that particles collecting therein pass downwardly in a gravity flow countercurrently to a rising stripping stream. Stripped contacted particles may subsequently pass from the separating and stripping zone to the upper portion of a vertically positioned regenerating or reactivation zone, such that they may pass therein downwardly countercurrently to an oxidizing gaseous stream introduced into the lower portion of the reactivating zone. The high pressure point or zone at the lower end of the regenerating zone, thus also aids in effecting the upward flow of the reactivating gaseous medium countercurrently to the descending particles, and insuring that the reactivating gaseous medium is precluded from passing with the particles from the regeneration zone to the reaction zone.

The particle contacting operation of the present invention may better be described by reference to the accompanying drawing and the following description thereof, which sets forth the improved arrangement and operation, as well as additional advantageous features thereof.

Figure 1 of the drawing is a diagrammatic elevational view of a particle contacting system and method of transporting particles in accordance with the present invention.

Figure 2 of the drawing indicates diagrammatically a portion of the unit at the lower end of the reaction zone, providing alternative means for separating and recombining the product stream with the contacted solid material.

Referring now to the drawing, there is shown a vertically disposed confined reaction chamber 1, having a conduit 2 discharging subdivided solid catalyst or contact material into the upper portion thereof so that a charge stream, such as a hydrocarbon gas oil stream for cracking and conversion in the presence of the solid contact material, may combine therewith. The charge stream, being introduced by way of valve 3 and line 3′, preferably, in turn communicates with a suitable distributing header 4 within the upper portion of the chamber 1. In the following description of the operation of this process, it will be assumed that a hydrocarbon gas-oil stream is being introduced into contact with a suitable cracking catalyst, such as hereinbefore described, which enters the reaction chamber by way of conduit 2 from the regeneration chamber 5, where it has been heated to a high temperature providing endothermic heat for carrying out a desirable catalytic cracking and conversion operation.

Steam or other substantially inert gaseous medium is introduced at a relatively high pressure through line 22 containing valve 23 into the transfer line 2, so that a high pressure zone in the system is provided at that point, with the steam passing upwardly through conduit 2 into the lower portion of the regenerating chamber 5, as well as downwardly through conduit 2 into the reaction zone 1. The steam pressure is however not high enough to prevent the downward movement of the column of catalyst particles passing into conduit 2 from the regenerator by the hydrostatic pressure of the total column of catalyst particles thereabove, thus there is insured a continuous and steady flow of reactivated catalyst material from the regeneration zone into the reaction zone. In the reaction zone 1, the catalyst particles move in a descending relatively compact bed of material cocurrently with a resulting vaporized hydrocarbon charge stream, which as noted, commingles with the descending bed of particles at the upper portion of the reaction zone. The size of the reaction chamber 1 and the rates of flow of the catalyst and charge streams are adjusted to provide desirable contact time between the hydrocarbon stream and catalyst, whereby to effect the desired conversion reaction.

Resulting vaporous conversion products are separated from the descending bed of particles by means of a system of collecting pipes or ducts 6, which in turn may be screened by suitable inverted troughs 6′ or the like. The collecting pipes 6 connect to a manifold line or withdrawal conduit 7. The separation of the product vapors and gases from the descending particles permits the latter to flow below the zone of the collecting conduits 6 substantially independent of the gas flow, or of the pressure in the system. Thus, the catalyst particles may pass in a relatively free gravity flow from the lower hopper like portion of chamber 1 into an outlet well 8 and through an orifice 9. The orifice may be of fixed cross-section or adjustable, and in this embodiment is preferably an iris type of construction which uniformly circumscribes the lower portion of the gas conducting conduit 7, whereby to provide for a uniform flow of the particles in an annular column downwardly around the centrally positioned manifold conduit 7. Inasmuch as the gas is substantially all transported through the central manifold line 7, the orifice 9 operates at a substantially zero pressure drop, with the flow rate therethrough being independent of the pressure. The resulting regulated flow of catalyst particles below the orifice 9 recombines the particles with the product stream at a point down stream from the orifice 9. Also in accordance with the preferred operation, the commingled stream of vapors and contacted particles, recombine in streams moving in the same direction to effect a fluidization of the particles and a gas-lift of the latter through the riser conduit 10 and upwardly to an elevated separating and stripping zone indicated at 11.

Preferably the separator and stripping zone 11 is a vertically disposed and confined zone having the riser conduit 10 discharge into the upper portion of the chamber such that the catalyst particles may settle into the lower portion of the chamber and the resulting product stream of cracked vapors and gases be collected within the upper portion of the chamber and discharged by way of line 12 and control valve 13. The elevated chamber 11 is maintained at a relatively low pressure, so that with a relatively high pressure within the lower portion of the reactor chamber 1, the gas flow is aided in effecting the fluidization and transporting of particles to the elevated separating and stripping zone 11.

Where the separating chamber 11 also serves as a stripping zone, a suitable stripping medium, such as steam, is introduced into the lower portion of chamber 11 by way of line 14 and valve 15, so that the gaseous medium may pass upwardly countercurrently through the descending bed of particles and effect the stripping of adsorbed and occluded vaporous conversion products. Resulting stripped and contacted catalyst particles are continuously passed from the lower end of the separating and stripping chamber 11 by way of a conduit 16, which in turn connects with and communicates with the interior of the upper portion of the regenerating chamber 5.

As in the other chambers, the catalyst particles move downwardly through the reactivation and regeneration zone in a relatively compact descending bed, and preferably countercurrently to the reactivating gaseous medium. In a hydrocarbon catalytic cracking process, air or other free-oxygen containing gaseous stream is introduced into the lower portion of the regenerator chamber 5 by way of line 17 and control valve 18, with distributing means 19 effecting a substantially uniform distribution of the oxygen containing stream into the descending bed of particles.

The oxygen containing stream effects the regeneration of the catalyst particles by the oxidation of carbonaceous and deleterious deposits on the catalyst particles, and provides a heated and substantially reactivated resulting catalyst which can be withdrawn from the lower portion of the chamber 5 by way of the conduit 2, while resulting flue and combustion gases may be discharged from the upper end of the regenerating zone by way of outlet line 20 and control valve 21. In accordance with a feature of the present improved operation, a high pressure zone is maintained at the lower end of the regenerator by virtue of the high pressure stream introduced into conduit 2 by way of line 22 and control valve 23, thus, steam passing upwardly through conduit 2 combines with the free-oxygen containing gas stream entering by way of conduit 17 and distributor 19, to ultimately reach the upper end of the regenerating chamber 5 and be discharged with the flue gas stream. The upper portion of regenerator 5, at the flue gas outlet zone, is also a low pressure point of the system insuring an upward flow of the gaseous stream countercurrently to the descending bed of catalyst particles. It may also be noted that the steam entering through conduit 22 and transfer conduit 2, effects a stripping of the reactivated gas particles prior to their introduction into the reaction chamber 1.

The steam, or other gaseous medium which is introduced by way of line 22 into conduit 2 and to provide a high pressure zone of that area, is preferably at a relatively high temperature in order that the column of catalyst particles descending through the transfer conduit 2 are not unduly lowered in temperature and may be transferred into the upper end of the reaction chamber 1 at a temperature sufficient to provide the desired endothermic heat for carrying out the catalytic cracking reaction. The relative pressures between the high pressure and lower pressure zones, must of course be regulated and adjusted to permit the continuous cyclic flow of material through the entire system. With the hydrostatic pressure of the column of catalyst particles from the upper separating and stripping chamber 11 providing continuous flow therefrom and through transfer conduit 16 into the upper portion of the regenerator 5, while the hydrostatic pressure of the column of catalyst continuously moving from the lower end of the regenerator 5 into the upper end of the reactor 1 is sufficient to maintain a continuous movement of catalyst particles to the latter zone, even with a high pressure point maintained in the transfer conduit 2 and within the upper portion of the reaction chamber. Still further, it is advantageous to have sufficient pressure differential between the lower end of the reaction chamber 1 and the elevated separating and stripping chamber 11 so that the gas-lift or fluidized transfer of catalyst particles from the lower end of the reactor chamber is aided by the lower pressure in the elevated zone.

In the embodiment of Figure 1, substantially all of the product stream, or the vaporous and/or gaseous stream being separated within the lower portion of the reaction chamber, is passed through the manifold line 7 and ultimately passes through the riser line 10 into the separating chamber 11 for discharge by way of line 12. However, in many operations it may be unnecessary to utilize the entire resulting product stream for effecting the fluidized lift of particles to an elevated zone. Thus, in an alternative embodiment, a portion of the product stream may be withdrawn or recovered without passing it through the riser line to an elevated separating zone.

Referring now to Figure 2 of the drawing, there is indicated a lower portion of a reactor chamber 1' having a plurality of gas and vapor collecting pipes or conduits 25, which for example may be perforated on their lower sides and having thereabove suitable inverted troughs 26, or the like, which prevent the passage of catalyst particles directly into the vapor collecting pipes. The plurality of collecting pipes 25 in turn communicate with a manifold or outlet conduit 27, which in turn passes outwardly from the chamber 1' and has control valve 28 regulating the discharge of reaction products to a suitable recovery zone. That portion of the products which is needed for the fluidized transporting of contacted catalyst particles is withdrawn from conduit 27 by way of line 29 and regulating valve 30. With the substantial removal of all of the vaporous and/or gaseous material from the lower end of the chamber by way of line 27, the catalyst particles pass downwardly over the inverted troughs 26 into the lower hopper like portion of chamber 1', wherefrom they pass in a gravity flow substantially free of the effect of the gas pressure in the contacting chamber. The flow of the catalyst particles is continuously downwardly through an outlet conduit 31 and a flow regulating orifice 32, which may be adjustable, but in general operates to regulate the flow of catalyst particles downwardly with little or no pressure drop across the valve. In this arrangement, wherein an adjustable valve is used, a substantially conventional slide valve may be utilized as the adjustable orifice 32 and it is not necessary to have an iris type of orifice such as indicated at 9 in Figure 1 of the drawing.

The arrangement of Figure 2 also utilizes the preferable feature of introducing the gaseous transporting stream through line 29 into conduit 31, such that the fluidizing stream passes in the same direction as the particle stream, without the turbulence and eddy effects resulting in the case where the catalyst particles fall downwardly into a rising gas stream. The catalyst particles are carried in a fluidized or gas-lift manner, upwardly through a suitable riser line to an elevated separating and collecting zone, such as the uppermost chamber of Figure 1 of the drawing. The reaction product stream discharged from the upper end of such an elevated chamber may be withdrawn and combined with the product stream passing outwardly from chamber 1' by way of conduit 27, and subsequently treated, or recovered in suitable fractionation and recovery apparatus.

The contacting and transporting operation as provided by the present invention, is, as previously noted, particularly advantageous for the treating of hydrocarbon streams in the presence of a catalyst. However, it is not intended to limit the operation to any one conversion process, such as catalytic cracking, for obviously the process may be used to advantage to effect the reforming, dehydrogenation, dehydrocyclization or aromatization, and the like, of various hydrocarbon charge streams in, the presence of a suitable catalyst. Also, the present cyclic system requires but a single fluidized lift of catalyst particles, for by placing each of the contacting zones in a substantially vertical superimposed relationship, the gravity flow of particles from one contacting zone to another provides simplicity of operation and eliminates the necessity of mechanical conveying equipment.

I claim as my invention:

1. A method for converting an organic reactant stream in the presence of subdivided solid contact material, which comprises, introducing said reactant stream into the upper portion of a confined reaction zone and passing it downwardly cocurrently with a descending bed of heated contacting particles, effecting the separation of a resulting vaporous product stream from said particles within the lower portion of said reaction zone and permitting the particles to discharge downwardly in a free flow through an adjustable restriction at the bottom of said zone, subsequently introducing at least a portion of the separated product stream in a downward direction into the downwardly moving stream of discharged particles passing through said restriction, passing the resulting mixture upwardly in a fluidized lift of said particles to an elevated confined separating zone, discharging the separated reaction product stream from the upper portion of said separating zone and passing the contacted particles downwardly in a gravity flow to the upper portion of a confined regeneration zone, introducing a free oxygen-containing gaseous stream to the lower portion of said regeneration zone and countercurrently contacting said particles as the latter descend in a substantially compact bed, removing resulting flue gases from the upper portion of said regeneration zone, and continuously passing resulting heated and reactivated particles from the lower end of said regeneration zone to the upper portion of said confined reaction zone.

2. A method for converting a hydrocarbon stream in the presence of catalyst particles, which comprises, introducing said hydrocarbon stream into the upper portion of a confined reaction zone maintained at an elevated pressure and passing said reactant stream downwardly cocurrently with a descending bed of heated catalyst particles, effecting the separation of a resulting vaporous product stream from said particles within the lower portion of the reaction zone and permitting contacted catalyst particles to discharge downwardly in a free flow through restricting means at the lower end of said reaction zone, subsequently introducing at least a portion of the separated vaporous product stream in a downward direction into the downwardly moving catalyst particles passing through said restricting means and passing the resultant mixture upwardly in a fluidized lift of said catalyst particles to an elevated and low pressure separating and stripping zone, discharging the vaporous reaction product stream from the upper portion of said separating and stripping zone and passing the contacted catalyst particles downwardly in a gravity flow through said stripping zone countercurrently to a stripping medium introduced into the lower end thereof, passing resulting stripped particles downwardly to the upper portion of a confined regeneration zone and passing them downwardly therethrough in a relatively compact bed countercurrently to a free oxygen-containing stream introduced into the lower end of said zone, removing resulting flue gases from the upper portion of said regeneration zone, and continuously passing resulting heated and reactivated particles from the lower end of said regeneration zone to the upper portion of said confined reaction zone.

3. The method of claim 2 further characterized in that a relatively high pressure stream of steam is introduced into admixture with said catalyst particles passing from the lower end of said regenerating zone to the upper portion of said reaction zone, said steam maintaining a high pressure zone within the upper portion of said reaction zone and the lower portion of said regeneration zone, said steam passing downwardly through said reaction zone cocurrently with said catalyst particles and reactant stream and upwardly through the regeneration zone cocurrently with said oxygen-containing stream, with hydrostatic pressure of the column of particles passing through said separating and stripping zone and through said regeneration zone sufficiently high to overcome the pressure of said steam being introduced below said regeneration zone and effecting the passage of catalyst particles into the upper portion of said reaction zone.

4. A method for converting a hydrocarbon stream in the presence of catalyst particles, which comprises, introducing said hydrocarbon stream into the upper portion of a confined reaction zone maintained at an elevated pressure and passing said hydrocarbon reactant stream downwardly concurrently with a descending bed of heated catalyst particles, separating a resulting vaporous product stream from said catalyst particles within the lower portion of the reaction zone, passing said product stream downwardly in a confined substantially straight path from the lower portion of said reaction zone and passing separated catalyst particles in a flow independent of said gaseous or vaporous product stream through flow restricting means and in a descending annular column of particles circumscribing said confined vapor product stream path, subsequently recombining said product stream with said catalyst particles as said product stream is passed in the same direction and concentrically into said descending column of particles, and effecting a fluidized lift of said catalyst particles to an elevated and lower pressure separating zone, discharging the vaporous product stream from the upper portion of said separating zone and passing separated contacted catalyst particles downwardly in a gravity flow through the lower portion of said separating zone countercurrently to a stripping medium, passing resulting stripped particles downwardly by gravity flow into the upper portion of a confined regeneration zone and in a descending relatively compact bed therethrough countercurrently to a free oxygen-containing stream introduced into the lower portion of said regeneration zone, removing resulting flue gases from the upper portion of the regeneration zone, and continuously passing resulting heated and reactivated particles in a descending column from the lower end of said regeneration zone to the upper portion of said confined reaction zone as said heated catalyst particles.

5. The method of claim 4 further characterized in that steam under superatmospheric pressure is introduced into the column of catalyst particles passing from the lower portion of said regeneration zone into the upper portion of said reaction zone, whereby to maintain a relatively high pressure within the upper portion of said reaction zone to aid the downward flow of the reactant stream and said fluidized lift of said catalyst particles to said elevated lower pressure separating zone, and said steam further maintaining a relatively high pressure zone within the lower portion of said regeneration zone and aiding the upward flow of said free oxygen-containing stream through said descending relatively compact bed of particles therein.

6. A method for converting a hydrocarbon reactant stream in the presence of catalyst particles, which comprises, introducing said hydrocarbon stream into the upper portion of a confined reaction zone maintained at an elevated pressure and passing said stream downwardly concurrently with a descending relatively compact bed of heated catalyst particles, separating a resulting vaporous product stream from said particles within the lower portion of the reaction zone, and permitting contacted catalyst particles to pass downwardly in a relatively free gravity flow through adjustable restricting means at the lower end of said reaction zone independent of the product stream, withdrawing the separated vaporous product stream from said reaction zone and subsequently recombining a portion thereof with the separated catalyst particles in an amount required for effecting the fluidized lift of catalyst particles to an elevated lower pressure separating zone, with said portion of the product stream being introduced in a downward direction into the downwardly moving stream of catalyst particles, discharging the vaporous product stream utilized for said particle lifting from the upper portion of said separating zone while passing contacted catalyst particles downwardly in a gravity flow to the lower portion thereof countercurrently to a stripping medium introduced at the lower end of said separating zone, passing resulting stripped catalyst particles downwardly in a gravity flow to the upper portion of a confined regeneration zone in a relatively compact column and subsequently passing said particles in a relatively compact bed countercurrently to a free oxygen-containing stream being introduced into the lower portion of said regeneration zone, continuously removing resulting flue gases from the upper portion of said regeneration zone, and continuously passing resulting heated and reactivated catalyst particles from the lower end of said regeneration zone in a descending column thereof to the upper portion of said confined reaction zone as said heated particles commingling with said reactant stream.

7. The method of claim 6 further characterized in that steam at a superatmospheric pressure is introduced into said column of catalyst particles descending from said regeneration zone to the upper portion of said reaction zone, said stream effecting a stripping of said reactivated catalyst particles and maintaining a high pressure zone within the lower portion of said regeneration zone effecting the upward passage of said free oxygen-containing stream countercurrently to the descending catalyst particles therein, and said steam effecting a high pressure zone within the upper portion of said reaction zone whereby to aid the downward flow of said reactant stream and the fluidized lift of contacted particles from the lower end of said reaction zone to said elevated lower pressure separating zone.

8. A conversion process which comprises passing a fluid reactant downwardly through a descending bed of heated particles of a solid contact material in a reaction zone, separating resultant vapors from solid particles in the lower portion of said zone, removing the solid particles from the bottom of said zone in a downwardly moving stream, introducing at least a portion of the separated vapors in a downward direction into said downwardly moving stream of particles discharging from the reaction zone, passing the resultant mixture upwardly to an elevated separating zone and therein separating the vapors from the solid particles, regenerating the latter and returning the regenerated particles to the upper portion of said reaction zone.

9. The process of claim 8 further characterized in that said reactant comprises a hydrocarbon and said contact material comprises a hydrocarbon conversion catalyst.

References Cited in the file of this patent

UNITED STATES PATENTS

| | | |
|---|---|---|
| 2,407,700 | Huff | Sept. 17, 1946 |
| 2,409,353 | Giuliani et al. | Oct. 15, 1946 |
| 2,456,715 | Leffer | Dec. 21, 1948 |
| 2,458,499 | Bergstrom | Jan. 11, 1949 |
| 2,541,077 | Leffer | Feb. 13, 1951 |
| 2,547,015 | Kirkbride | Apr. 3, 1951 |
| 2,548,286 | Bergstrom | Apr. 10, 1951 |